United States Patent
Masuda et al.

(10) Patent No.: US 11,082,623 B2
(45) Date of Patent: Aug. 3, 2021

(54) IMAGING CONTROL DEVICE, IMAGING APPARATUS, IMAGING CONTROL METHOD, AND IMAGING CONTROL PROGRAM WITH LIGHT MEASUREMENT

(71) Applicant: FUJIFILM Corporation, Tokyo (JP)

(72) Inventors: Tomonori Masuda, Saitama (JP); Hitoshi Sakurabu, Saitama (JP); Ryo Hasegawa, Saitama (JP); Makoto Kobayashi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/013,877

(22) Filed: Sep. 8, 2020

(65) Prior Publication Data

US 2020/0404139 A1    Dec. 24, 2020

Related U.S. Application Data

(63) Continuation of application No. PCT/JP2019/009417, filed on Mar. 8, 2019.

(30) Foreign Application Priority Data

Mar. 9, 2018 (JP) .............................. JP2018-043103

(51) Int. Cl.
*H04N 9/083* (2006.01)
*H04N 5/235* (2006.01)
*H04N 5/238* (2006.01)

(52) U.S. Cl.
CPC ........... *H04N 5/2351* (2013.01); *H04N 5/238* (2013.01)

(58) Field of Classification Search
CPC combination set(s) only.
See application file for complete search history.

(56) References Cited

U.S. PATENT DOCUMENTS

| 2007/0248349 A1* | 10/2007 | Nanjo | H04N 5/238 396/241 |
| 2020/0228694 A1* | 7/2020 | Ishida | G03B 17/20 |
| 2021/0006701 A1* | 1/2021 | Sakurabu | G02B 7/28 |

FOREIGN PATENT DOCUMENTS

| JP | 2015092660 | 5/2015 |
| JP | 2016015599 | 1/2016 |

OTHER PUBLICATIONS

"International Search Report (Form PCT/ISA/210) of PCT/JP2019/009417," dated May 7, 2019, with English translation thereof, pp. 1-3.

(Continued)

*Primary Examiner* — Gary C Vieaux
(74) *Attorney, Agent, or Firm* — JCIPRNET

(57) ABSTRACT

An imaging control device includes: a transmittance control unit that controls transmittance of each of a plurality of regions in an optical element for controlling a quantity of light incident on an imaging element to a different value; an imaging control unit that causes the imaging element to perform imaging for light measurement in a state where the transmittance of each of the plurality of regions is controlled to the different value; a light measurement processing unit that measures brightness of a subject based on a captured image signal obtained from the imaging element by the imaging for light measurement; an image processing unit that generates image data for display from the captured image signal obtained by the imaging for light measurement; and an output unit that outputs the image data for display to a display unit displaying an image.

19 Claims, 11 Drawing Sheets

(56) References Cited

OTHER PUBLICATIONS

"International Preliminary Report on Patentability (Form PCT/IPEA/409) of PCT/JP2019/009417," completed on Aug. 27, 2019, with English translation thereof, pp. 1-6.

* cited by examiner

IMAGING CONTROL DEVICE, IMAGING APPARATUS, IMAGING CONTROL METHOD, AND IMAGING CONTROL PROGRAM WITH LIGHT MEASUREMENT

CROSS REFERENCE TO RELATED APPLICATION

This is a continuation of International Application No. PCT/JP2019/009417 filed on Mar. 8, 2019, and claims priority from Japanese Patent Application No. 2018-043103 filed on Mar. 9, 2018, the entire disclosures of which are incorporated herein by reference.

BACKGROUND OF THE INVENTION

1. Field of the Invention

The present invention relates to an imaging control device, an imaging apparatus, an imaging control method, and a computer readable medium storing an imaging control program.

2. Description of the Related Art

In an imaging apparatus in which a light measurement sensor is not disposed, a method of performing light measurement based on a plurality of captured image signals of different brightness acquired using an imaging element in order to decide appropriate exposure is known. However, in the method of performing light measurement by acquiring the plurality of captured image signals, the amount of time necessary for light measurement is increased.

JP2016-015599A discloses an imaging apparatus comprising a variable transmittance type light reduction filter in which physical property elements capable of adjusting the quantity of light incident on an imaging element are two-dimensionally arranged.

This imaging apparatus enables high accuracy light measurement by performing imaging once by performing light measurement on a subject based on the captured image signals acquired in a state where the transmittance of light of the light reduction filter is set to vary in a plurality of regions in an angle of view.

SUMMARY OF THE INVENTION

In order to decide appropriate exposure at the time of imaging for live view image display, the imaging apparatus disclosed in JP2016-015599A acquires the captured image signals in a state where the transmittance of light of the light reduction filter is set to vary in the plurality of regions in the angle of view, and obtains the brightness of the subject based on the captured image signals. Then, imaging for live view image display is started by performing exposure corresponding to the brightness.

For example, a case where an instruction to automatically perform exposure for still picture recording is provided and light measurement is performed using the above method is considered. In this case, the captured image signals acquired for performing light measurement are not displayed as a live view image. Thus, during a short period after the instruction is provided, a state where the live view image is not updated or a state of blackout occurs, and there is a possibility of losing the subject.

The present invention is conceived in view of the above matter, and an object thereof is to provide an imaging control device, an imaging apparatus, an imaging control method, and a computer readable medium storing an imaging control program capable of establishing both an increase in speed of a light measurement operation for a subject and an increase in quality of a live view image.

An imaging control device of the present invention comprises a transmittance control unit that controls transmittance of each of a plurality of regions in an optical element for controlling a quantity of light incident on an imaging element to a different value, an imaging control unit that causes the imaging element to perform imaging for light measurement in a state where the transmittance of each of the plurality of regions is controlled to the different value, a light measurement processing unit that measures brightness of a subject based on a captured image signal obtained from the imaging element by the imaging for light measurement, an image processing unit that generates image data for display from the captured image signal obtained by the imaging for light measurement, and an output unit that outputs the image data for display to a display unit displaying an image.

An imaging apparatus of the present invention comprises the imaging control device, and the imaging element.

An imaging control method of the present invention comprises a transmittance control step of controlling transmittance of each of a plurality of regions in an optical element for controlling a quantity of light incident on an imaging element to a different value, an imaging control step of causing the imaging element to perform imaging for light measurement in a state where the transmittance of each of the plurality of regions is controlled to the different value, a light measurement processing step of measuring brightness of a subject based on a captured image signal obtained from the imaging element by the imaging for light measurement, an image processing step of generating image data for display from the captured image signal obtained by the imaging for light measurement, and an output step of outputting the image data for display to a display unit displaying an image.

An imaging control program of the present invention causes a computer to execute a transmittance control step of controlling transmittance of each of a plurality of regions in an optical element for controlling a quantity of light incident on an imaging element to a different value, an imaging control step of causing the imaging element to perform imaging for light measurement in a state where the transmittance of each of the plurality of regions is controlled to the different value, a light measurement processing step of measuring brightness of a subject based on a captured image signal obtained from the imaging element by the imaging for light measurement, an image processing step of generating image data for display from the captured image signal obtained by the imaging for light measurement, and an output step of outputting the image data for display to a display unit displaying an image.

According to the present invention, an imaging control device, an imaging apparatus, an imaging control method, and an imaging control program capable of establishing both an increase in speed of a light measurement operation for a subject and an increase in quality of a live view image can be provided.

BRIEF DESCRIPTION OF THE DRAWINGS

FIG. 6 is a function block diagram of a digital signal processing unit 17 illustrated in

FIG. 1.

DESCRIPTION OF THE PREFERRED EMBODIMENTS

Hereinafter, an embodiment of the present invention will be described with reference to the drawings.

Figure 1:
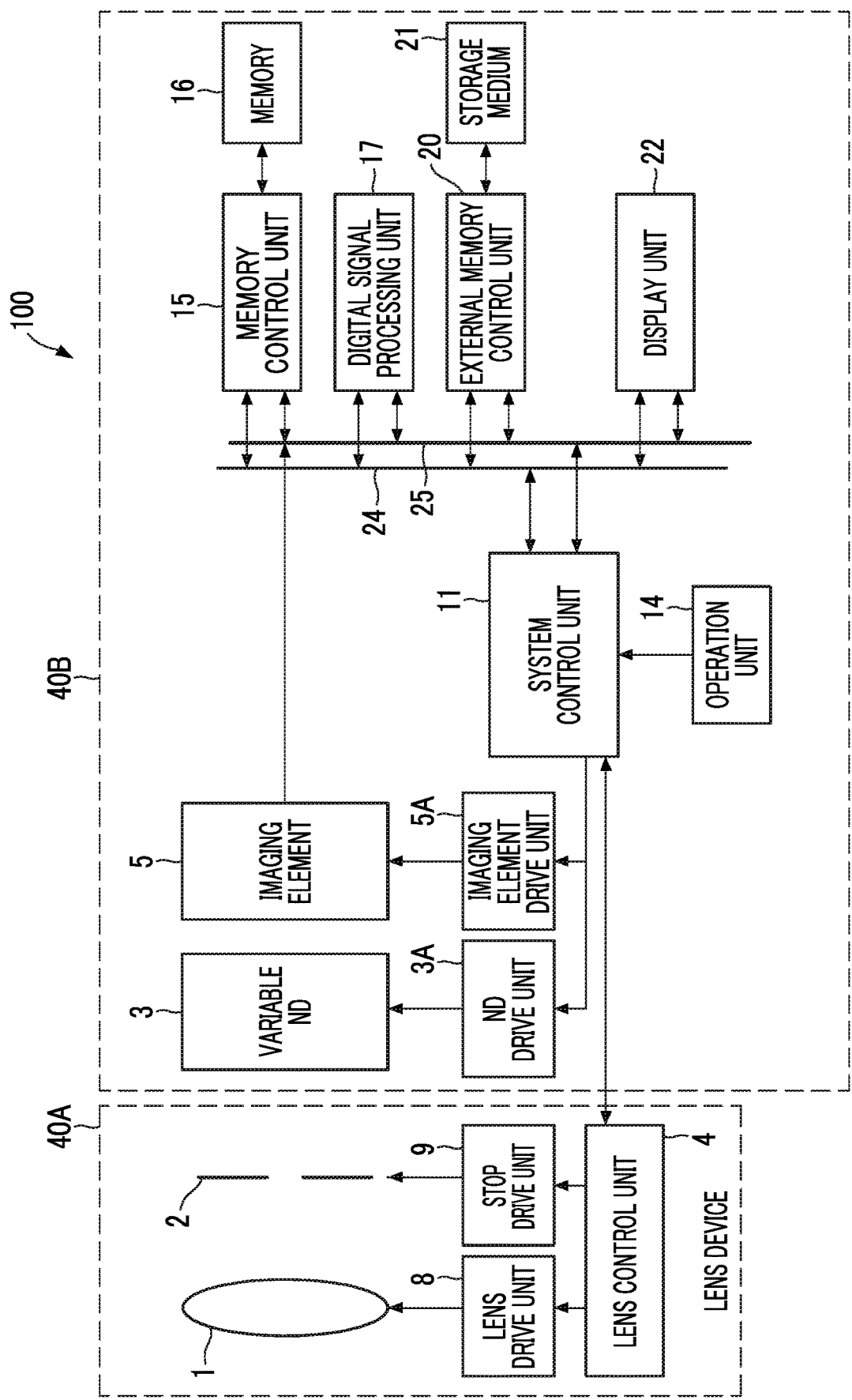
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is an imaging apparatus according to one embodiment of the present invention.

The digital camera 100 illustrated in FIG. 1 comprises a lens device 40 that includes an imaging lens 1, a stop 2, a lens control unit 4, a lens drive unit 8, and a stop drive unit 9; and a main body unit 40B.

The lens device 40A may be attachable and detachable with respect to the main body unit 40B or may be integrated with the main body unit 40B. In a configuration in which the lens device 40A is attachable and detachable with respect to the main body unit 40B, the main body unit 40B constitutes the imaging apparatus.

The imaging lens 1 includes a focus lens, a zoom lens, or the like that can be moved in an optical axis direction.

The lens control unit 4 of the lens device 40A is configured to be capable of communicating with a system control unit 11 of the main body unit 40B in a wired or wireless manner.

In accordance with an instruction from the system control unit 11, the lens control unit 4 changes the position of a principal point of the focus lens by controlling the focus lens included in the imaging lens 1 through the lens drive unit 8, changes the position of the zoom lens by controlling the zoom lens included in the imaging lens 1 through the lens drive unit 8, or controls an F number of the stop 2 through the stop drive unit 9.

The main body unit 40B comprises an imaging element 5 such as a charged coupled device (CCD) type image sensor or a metal oxide semiconductor (MOS) type image sensor that images a subject through an imaging optical system including the imaging lens 1 and the stop 2, an imaging element drive unit 5A that drives the imaging element 5, a neutral density (ND) filter 3 that is arranged between the imaging element 5 and the imaging optical system, an ND drive unit 3A that drives the variable ND filter 3, the system control unit 11 that manages and controls the entire main body unit 40B, and an operation unit 14.

The imaging element 5 includes an imaging surface on which a plurality of pixels are two-dimensionally arranged, converts a subject image formed on the imaging surface by the imaging optical system into pixel signals by the plurality of pixels, and outputs the pixel signals. Hereinafter, a set of pixel signals output from the pixels of the imaging element 5 will be referred to as a captured image signal.

The imaging element drive unit 5A drives the imaging element 5 by generating a drive signal based on an instruction from the system control unit 11 and supplying the drive signal to the imaging element 5.

The variable ND filter 3 is an optical element for controlling the quantity of light incident on the imaging element 5 and can partially change the transmittance of light.

Specifically, the variable ND filter 3 has a configuration in which physical property elements (for example, liquid crystal elements or electrochromic elements) that can change the transmittance by an applied voltage are two-dimensionally arranged.

The variable ND filter 3 may be integrally formed with the imaging element 5. For example, the imaging element 5 comprises an imaging element chip, a package that accommodates the imaging element chip, and a protective cover that seals the package. The variable ND filter 3 may be laminated on the protective cover.

The ND drive unit 3A controls the transmittance of the variable ND filter 3 by controlling a voltage applied to each physical property element of the variable ND filter 3 in accordance with an instruction from the system control unit 11.

The system control unit 11 manages and controls the entire digital camera 100. A hardware structure of the system control unit 11 corresponds to various processors that perform processing by executing programs including an imaging control program.

The various processors include a central processing unit (CPU) that is a general-purpose processor performing various types of processing by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific type of processing like an application specific integrated circuit (ASIC).

More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

The main body unit 40B further comprises a memory 16 including a random access memory (RAM) and a read only memory (ROM), a memory control unit 15 that controls data storage in the memory 16 and data read from the memory 16, a digital signal processing unit 17 that generates captured image data in accordance with various formats such as Joint Photographic Experts Group (JPEG) format by performing digital signal processing on the captured image signal output from the imaging element 5, an external memory control unit 20 that controls data storage in a storage medium 21 and data read from the storage medium 21, and a display unit 22 including an organic electroluminescence (EL) panel, a liquid crystal panel, or the like for displaying images.

The ROM included in the memory 16 stores programs executed by the system control unit 11 including the imaging control program.

The memory control unit 15, the digital signal processing unit 17, the external memory control unit 20, and the display unit 22 are connected to each other through a control bus 24 and a data bus 25 and are controlled by instructions from the system control unit 11.

A hardware structure of the digital signal processing unit 17 corresponds to the above illustrated various processors that perform processing by executing programs including the imaging control program.

Figure 2:
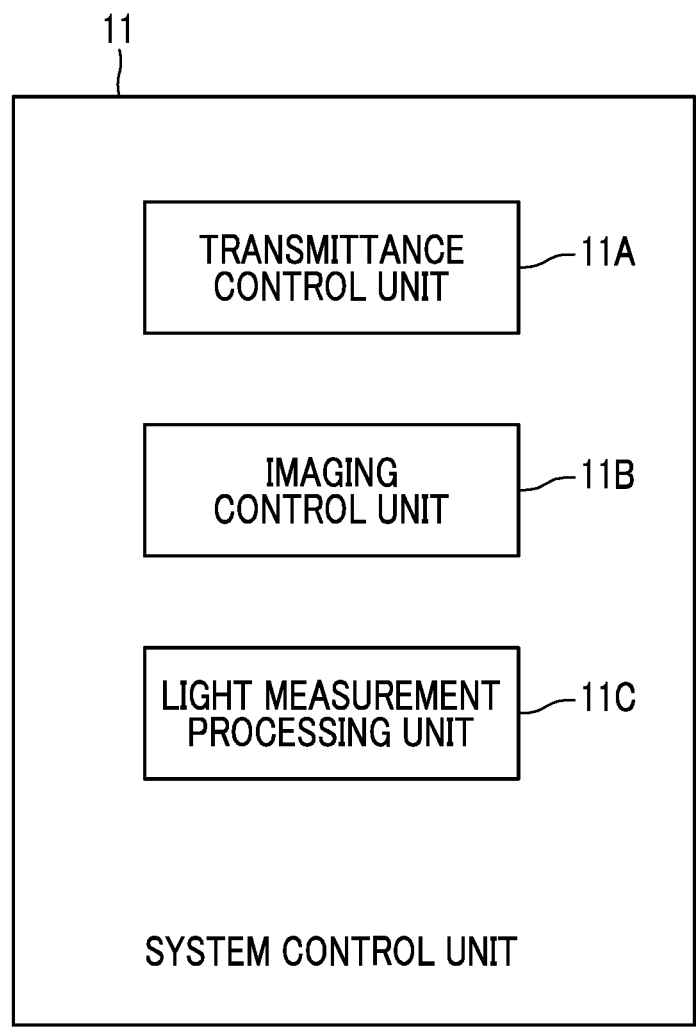
FIG. 2 is a function block diagram of a system control unit 11 illustrated in FIG. 1.

FIG. 2 is a function block diagram of the system control unit 11 illustrated in FIG. 1.

By executing the programs stored in the ROM of the memory 16 including the imaging control program, the system control unit 11 functions as a transmittance control unit 11A, an imaging control unit 11B, and a light measurement processing unit 11C.

The transmittance control unit 11A controls the transmittance of each of a plurality of regions constituting a light transmission area of the variable ND filter 3 to a different value. Hereinafter, an example of a specific control content for transmittance will be described with reference to FIG. 3 to FIG. 5.

Figure 3:
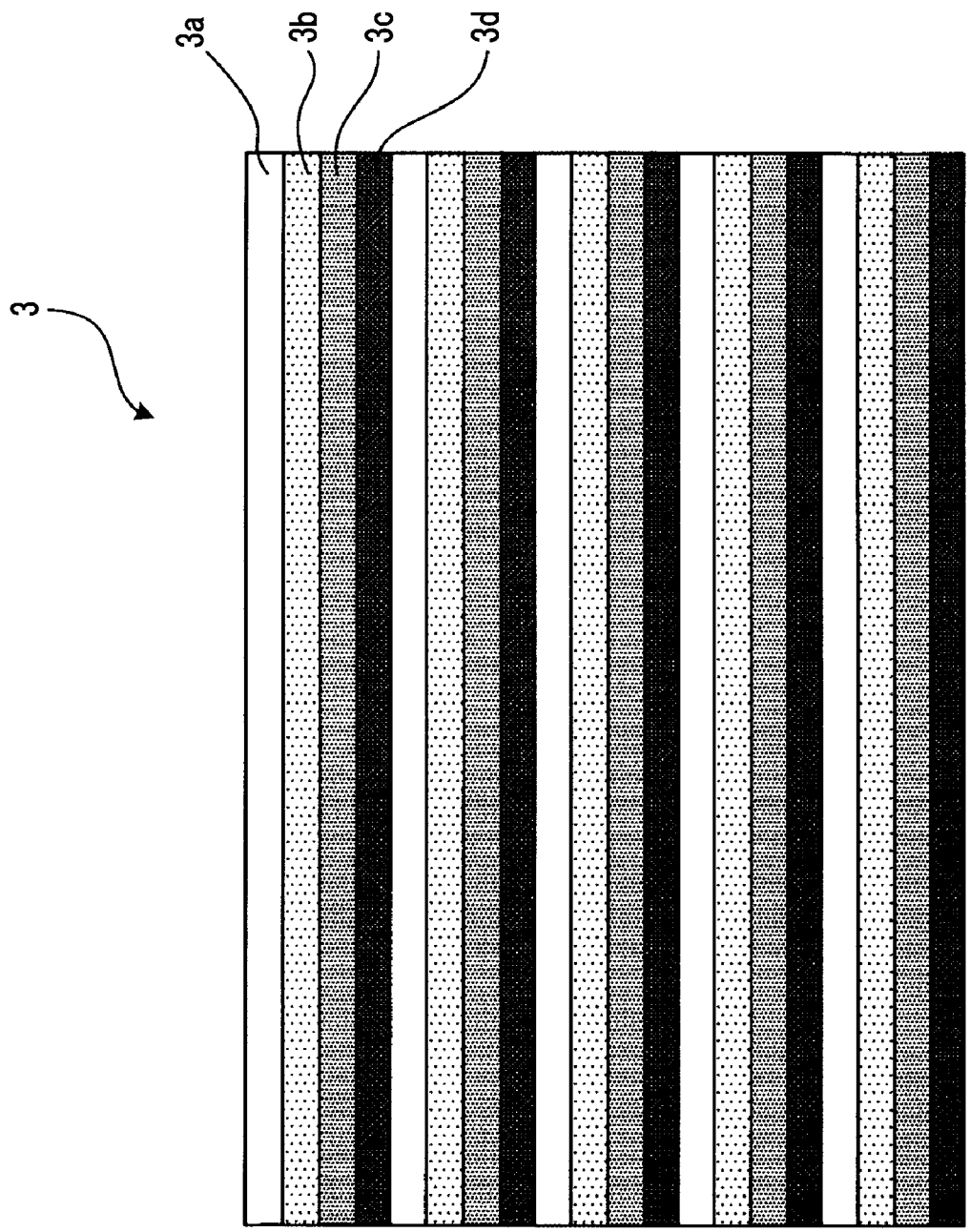
FIG. 3 is a schematic diagram for describing a first example of a control content of a transmittance control unit 11A.

FIG. 3 is a schematic diagram for describing a first example of a control content of the transmittance control unit 11A.

As illustrated in FIG. 3, the transmittance control unit 11A divides the light transmission area of the variable ND filter 3 into four regions including a first region 3a, a second region 3b, a third region 3c, and a fourth region 3d and controls the transmittance of light of each of the four regions to a different value. Subject light transmitted through the four regions illustrated in FIG. 4 is incident on the imaging surface of the imaging element 5.

The first region 3a is, for example, a region having transmittance of 100%. The second region 3b is, for example, a region having transmittance of 80%. The third region 3c is, for example, a region having transmittance of 50%. The fourth region 3d is, for example, a region having transmittance of 20%. These numerical values are one example, and the present invention is not limited to the example.

In the example in FIG. 3, a set in which the first region 3a, the second region 3b, the third region 3c, and the fourth region 3d are arranged in this order in a short direction of the imaging element 5 is repeatedly arranged in the short direction of the imaging element 5 over the entire light transmission area. Each region constituting the set constitutes a sub-region. That is, in the example in FIG. 3, the first region 3a, the second region 3b, the third region 3c, and the fourth region 3d are arranged in a shape of horizontal stripes.

Figure 4:
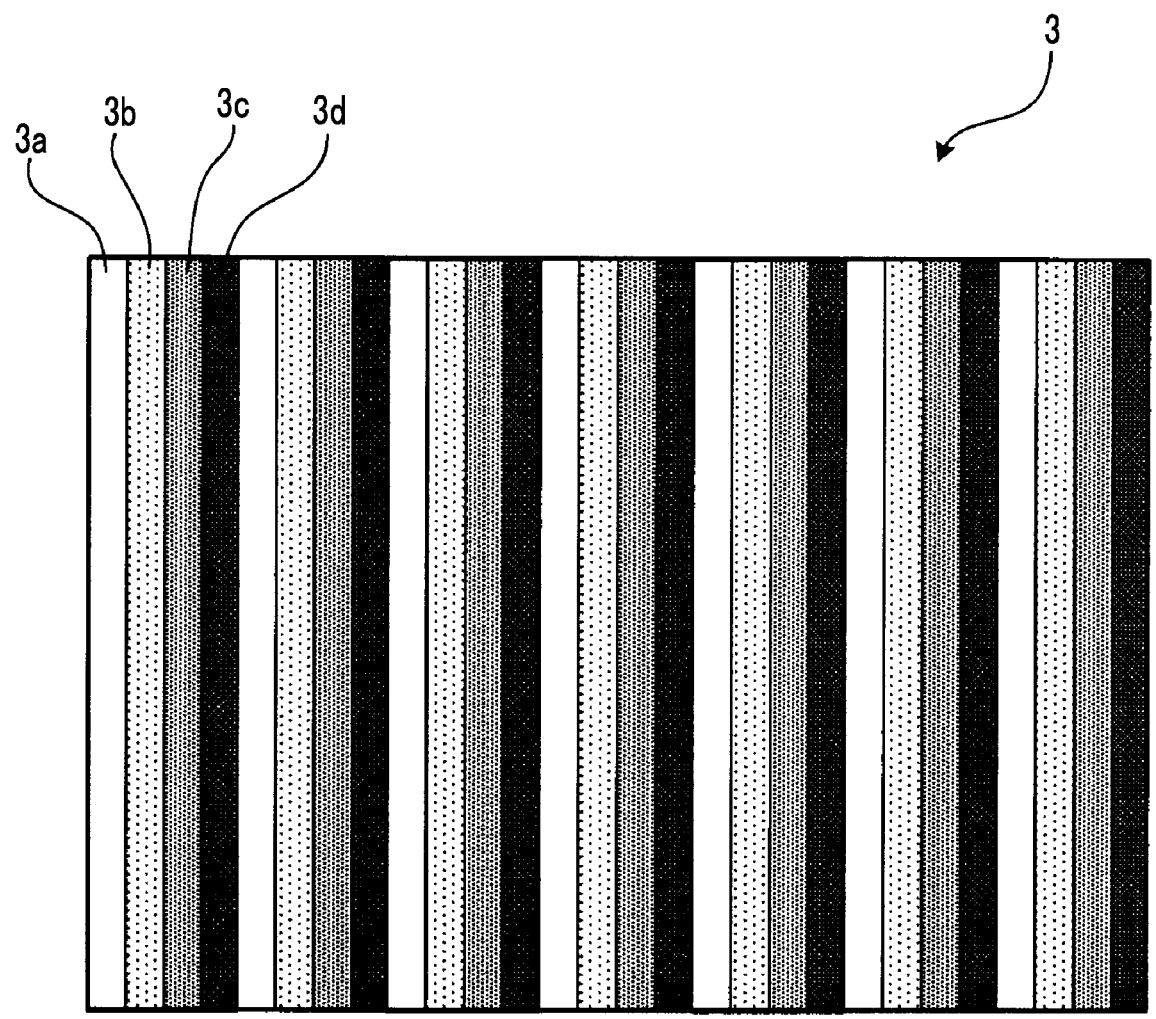
FIG. 4 is a schematic diagram for describing a second example of the control content of the transmittance control unit 11A.

FIG. 4 is a schematic diagram for describing a second example of the control content of the transmittance control unit 11A.

An example illustrated in FIG. 4 is a modification example of arrangement of the first region 3a, the second region 3b, the third region 3c, and the fourth region 3d illustrated in FIG. 3.

In the example in FIG. 4, a set in which the first region 3a, the second region 3b, the third region 3c, and the fourth region 3d are arranged in this order in a longitudinal direction of the imaging element 5 is repeatedly arranged in the longitudinal direction of the imaging element 5 over the entire light transmission area. Each region constituting the set constitutes a sub-region. That is, in the example in FIG. 4, the first region 3a, the second region 3b, the third region 3c, and the fourth region 3d are arranged in a shape of vertical stripes.

While an example in which the number of regions of different transmittance constituting the set is four in FIG. 3 and FIG. 4, the number of regions may be greater than or equal to two.

Figure 5:
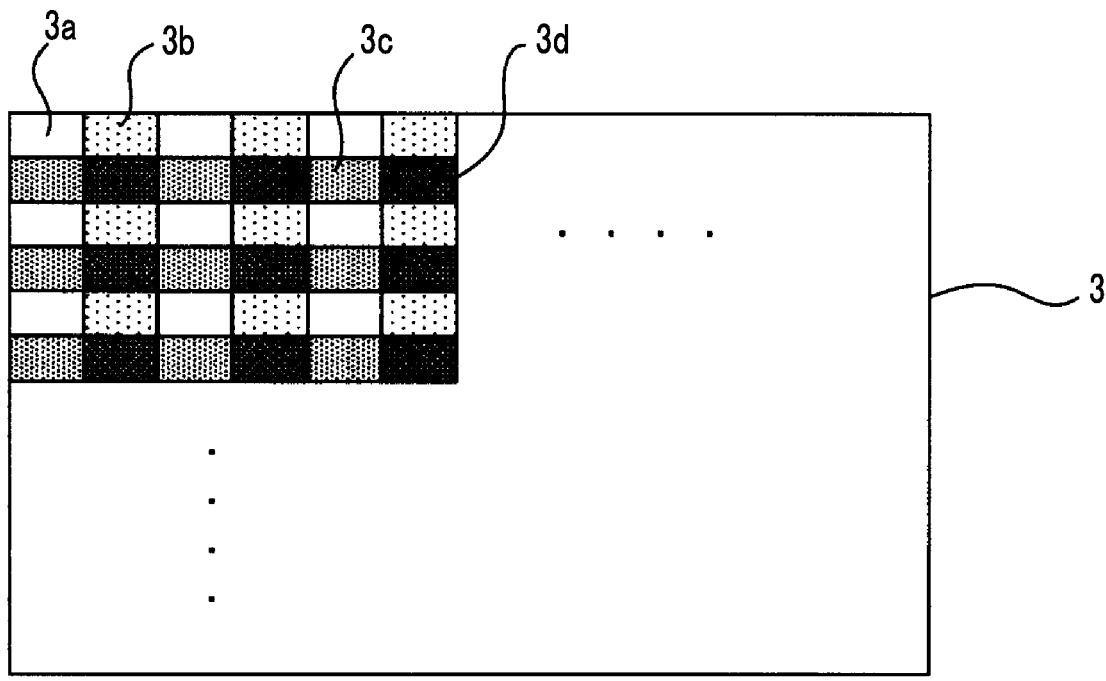
FIG. 5 is a schematic diagram for describing a third example of the control content of the transmittance control unit 11A.

FIG. 5 is a schematic diagram for describing a third example of the control content of the transmittance control unit 11A.

An example illustrated in FIG. 5 is another modification example of arrangement of the first region 3a, the second region 3b, the third region 3c, and the fourth region 3d illustrated in FIG. 3.

In the example in FIG. 5, a set of the first region 3a, the second region 3b, the third region 3c, and the fourth region 3d arranged in a lattice form is repeatedly arranged in a lattice form over the entire light transmission area. Each region constituting the set constitutes a sub-region.

Returning to FIG. 2, the imaging control unit 11B causes the imaging element 5 to perform imaging for light measurement in a state where the transmittance of each of the plurality of regions of the variable ND filter 3 is set to a different value as illustrated in FIG. 3 to FIG. 5.

The captured image signal output from the imaging element 5 by the imaging for light measurement is configured with a first pixel signal group (pixel signal group corresponding to the first region 3a) that corresponds to the subject light transmitted through the first region 3a and is the brightest, a second pixel signal group (pixel signal group corresponding to the second region 3b) that corresponds to the subject light transmitted through the second region 3b and is darker than the first pixel signal group, a third pixel signal group (pixel signal group corresponding to the third region 3c) that corresponds to the subject light transmitted through the third region 3c and is darker than the second pixel signal group, and a fourth pixel signal group (pixel signal group corresponding to the fourth region 3d) that corresponds to the subject light transmitted through the fourth region 3d and is darker than the third pixel signal group.

The light measurement processing unit 11C measures the brightness of the subject in imaging based on the captured image signal obtained from the imaging element 5 by the imaging for light measurement.

For example, in the case of performing multi-pattern light measurement of designating the entire imaging surface as a light measurement region, the light measurement processing unit 11C divides the captured image signal into a plurality of areas and measures the brightness of the subject in each divided area based on each of the first pixel signal group, the second pixel signal group, the third pixel signal group, and the fourth pixel signal group present in each divided area. The light measurement processing unit 11C measures the brightness of the subject in the entire imaging range in accordance with the measured brightness of the subject in all divided areas.

In the case of performing center-weighted light measurement of designating a divided area present in a center portion of the imaging surface as a light measurement region or spot light measurement of designating a divided area present in a region to which a focal point is desired to be set on the imaging surface, the light measurement processing unit 11C measures the brightness of the subject of the divided area based on each of the first pixel signal group, the second pixel signal group, the third pixel signal group, and the fourth pixel signal group present in the divided area designated as the light measurement region.

The imaging control unit 11B decides appropriate exposure based on the brightness of the subject measured by the light measurement processing unit 11C and causes the imaging element 5 to image the subject under an imaging condition (an F number, an exposure time period, and imaging sensitivity) with which appropriate exposure is obtained.

Figure 6:
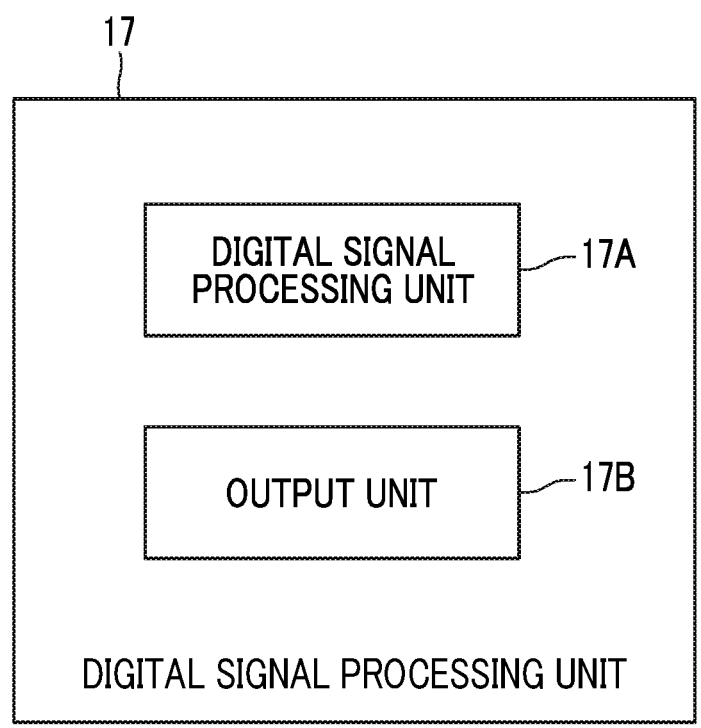

FIG. 6 is a function block diagram of the digital signal processing unit 17 illustrated in FIG. 1.

The digital signal processing unit 17 functions as an image processing unit 17A and an output unit 17B by executing the programs stored in the ROM of the memory 16 including the imaging control program.

An imaging control device is configured with the transmittance control unit 11A, the imaging control unit 11B, and the light measurement processing unit 11C in FIG. 2 and the image processing unit 17A and the output unit 17B in FIG. 6.

The image processing unit 17A generates image data for live view display to be displayed on the display unit 22 from the captured image signal obtained by the imaging for light measurement performed based on control of the imaging control unit 11B. A specific example of a method of generating the image data will be described later.

The output unit 17B displays a live view image based on the image data on the display unit 22 by outputting the image data for live view display generated by the image processing unit 17A to the display unit 22.

Figure 7:
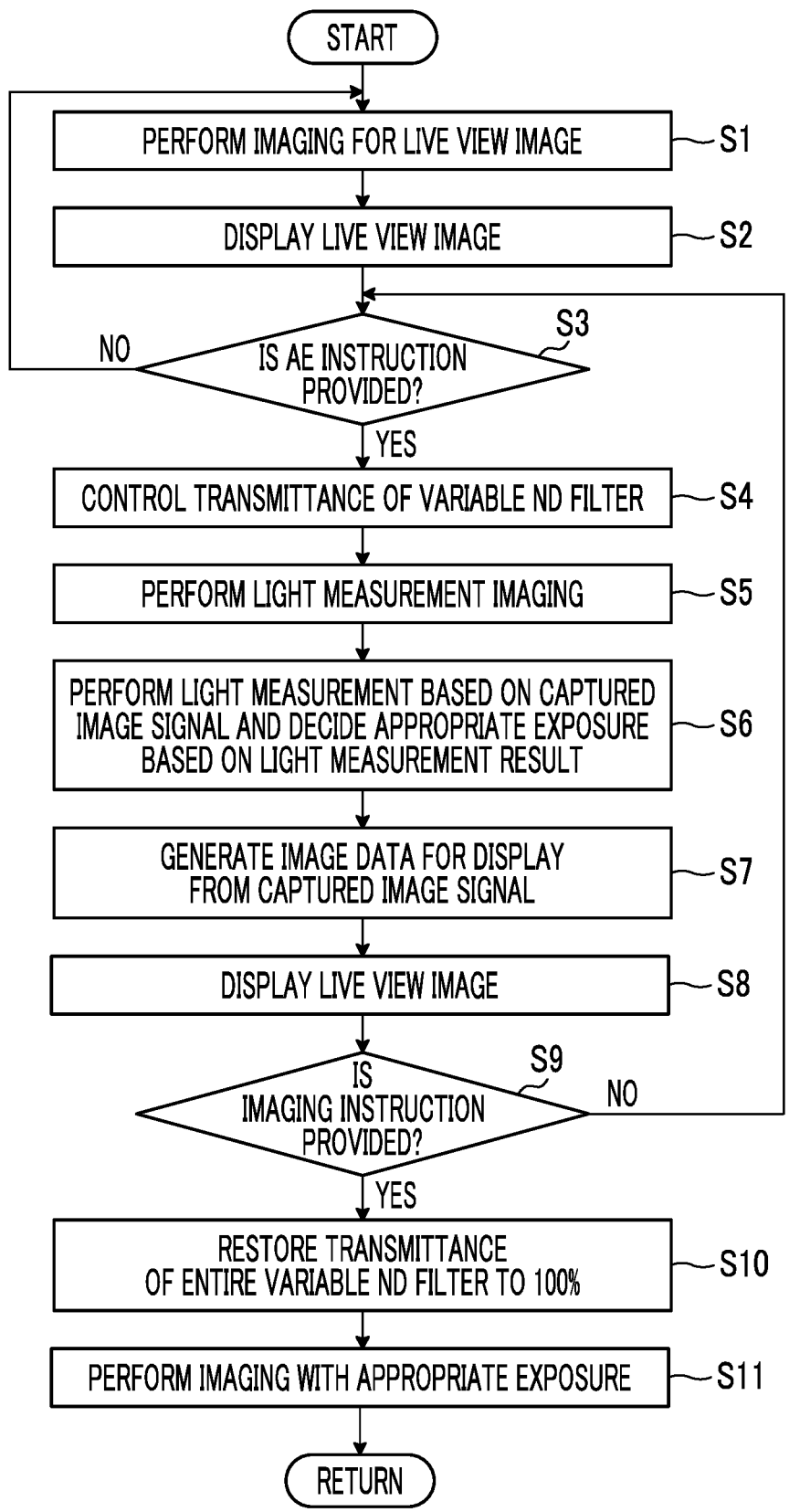
FIG. 7 is a flowchart for describing an operation at a time of an imaging mode of the digital camera 100 illustrated in FIG. 1.

FIG. 7 is a flowchart for describing an operation at the time of an imaging mode of the digital camera 100 illustrated in FIG. 1.

In an initial state where the imaging mode is set, the transmittance control unit 11A of the system control unit 11 controls the transmittance of all physical property elements of the variable ND filter 3 to 100%.

In a case where the imaging mode is set, the system control unit 11 causes the imaging element 5 to perform imaging for displaying the live view image (step S1).

The image data for live view display is generated by processing the captured image signal output from the imaging element 5 by the imaging by the digital signal processing unit 17, and the live view image is displayed on the display unit 22 based on the image data (step S2).

After step S2, processing of step S1 and step S2 is repeated until an auto exposure (AE) execution instruction is provided by performing pushing or the like on a release button included in the operation unit 14 in step S3.

In a case where the AE execution instruction is provided in step S3 (step S3: YES), for example, the transmittance control unit 11A of the system control unit 11 controls the transmittance of the variable ND filter 3 to the state of any of FIG. 3 to FIG. 5 (step S4). Step S4 constitutes a transmittance control step.

Then, the imaging control unit 11B of the system control unit 11 causes the imaging element 5 to perform the imaging for light measurement (step S5). In a case where the captured image signal is output from the imaging element 5 by the imaging for light measurement, the captured image signal is acquired by the light measurement processing unit 11C of the system control unit 11. Step S5 constitutes an imaging control step.

The light measurement processing unit 11C measures the brightness of the subject from the acquired captured image signal using the above method. Appropriate exposure is decided by the imaging control unit 11B based on the brightness (step S6). Step S6 constitutes a light measurement processing step.

After processing of step S6 or in parallel with the processing, the image processing unit 17A of the digital signal processing unit 17 generates the image data for live view display from the captured image signal obtained by the imaging for light measurement (step S7). Step S7 constitutes an image processing step.

In step S7, the image processing unit 17A generates the image data for live view display based on any one pixel signal group of the first pixel signal group, the second pixel signal group, the third pixel signal group, and the fourth pixel signal group constituting the captured image signal.

Any predetermined pixel signal group may be selected, or the pixel signal group may be decided based on the brightness of the subject measured by the light measurement processing unit 11C.

For example, the image processing unit 17A selects the first pixel signal group obtained in the state of transmittance of 100% from the first pixel signal group, the second pixel signal group, the third pixel signal group, and the fourth pixel signal group as any pixel signal group.

According to this selection method, the live view image displayed immediately before the AE instruction and the live view image updated after the AE instruction can be set to the same brightness, and the visibility of the live view image can be increased.

In the case of selecting one pixel signal group based on the brightness of the subject measured by the light measurement processing unit 11C, for example, the image processing unit 17A selects the pixel signal group having brightness most similar to the brightness of the subject from the first pixel signal group, the second pixel signal group, the third pixel signal group, and the fourth pixel signal group. According to this selection method, the live view image more similar to the actual subject can be displayed.

In a case where the image data for live view display is generated, the image data is output to the display unit 22, and the live view image based on the image data is displayed on the display unit 22 in step S8 (step S8). Step S8 constitutes an output step.

Then, processing of step S3 to step S8 is repeated until an imaging instruction for recording is provided by pushing the release button included in the operation unit 14 in step S9.

In a case where the imaging instruction is provided by pushing the release button included in the operation unit 14 (step S9: YES), the transmittance control unit 11A of the system control unit 11 restores the transmittance of all physical property elements of the variable ND filter 3 to 100% (step S10).

Then, the imaging control unit 11B of the system control unit 11 causes the imaging element 5 to perform imaging for recording under the imaging condition for appropriate exposure decided in step S6 (step S11). After step S11, processing returns to step S1 (return).

As described above, according to the digital camera 100, a plurality (in the example in FIG. 3 to FIG. 5, four) of pixel signal groups of different brightness can be obtained by performing the imaging for light measurement once. Thus, even by performing imaging once, a light measurement image in which washed-out whites and blocked-up shadows are prevented can be obtained, and the brightness of the subject can be accurately and quickly measured.

According to the digital camera 100, the image data for live view display is generated from any one pixel signal group of the plurality of pixel signal groups constituting the captured image signal obtained by the imaging for light measurement. Thus, the live view image can be updated immediately after the imaging for light measurement is performed, and the risk of losing the subject can be reduced.

According to the digital camera 100, the image data for live view display can be generated using the pixel signal group having brightness most similar to the brightness of the subject measured by the light measurement processing unit 11C. According to this configuration, since the live view image more similar to the look of the actual subject can be displayed, the risk of losing the subject can be reduced.

In the case of selecting one pixel signal group based on the brightness of the subject measured by the light measurement processing unit 11C, the image processing unit 17A may select the pixel signal group having brightness second most similar to the brightness of the subject from the first pixel signal group, the second pixel signal group, the third pixel signal group, and the fourth pixel signal group. Even with this configuration, the live view image similar to the look of the actual subject can be displayed.

As described above, according to a configuration in which the pixel signal group selected by the image processing unit 17A is predetermined, display of the live view image can be started without waiting for a light measurement result of the light measurement processing unit 11C. Thus, the live view image can be smoothly displayed.

In the configuration in which the pixel signal group selected by the image processing unit 17A is predetermined, the pixel signal group may be preferentially read out in the case of reading out the captured image signal from the imaging element 5. Accordingly, the live view image can be further quickly updated.

The image processing unit 17A may generate the image data for live view display using at least one of three pixel signal groups excluding any one pixel signal group of the four pixel signal groups. For example, the image processing unit 17A selects the first pixel signal group and the second pixel signal group corresponding to the first region 3a and the second region 3b that are adjacent in the light transmission area of the variable ND filter 3, and generates one pixel signal group by averaging at pixel positions near each other in the pixel signal groups. The image data for live view display is generated based on this one pixel signal group. Even by doing so, the live view image can be updated during light measurement processing. In addition, since the brightness of two or more pixel signal groups is averaged, the look of the live view image can be improved.

Hereinafter, a modification example of the method of generating the image data for live view display by the image processing unit 17A will be described.

Figure 8:
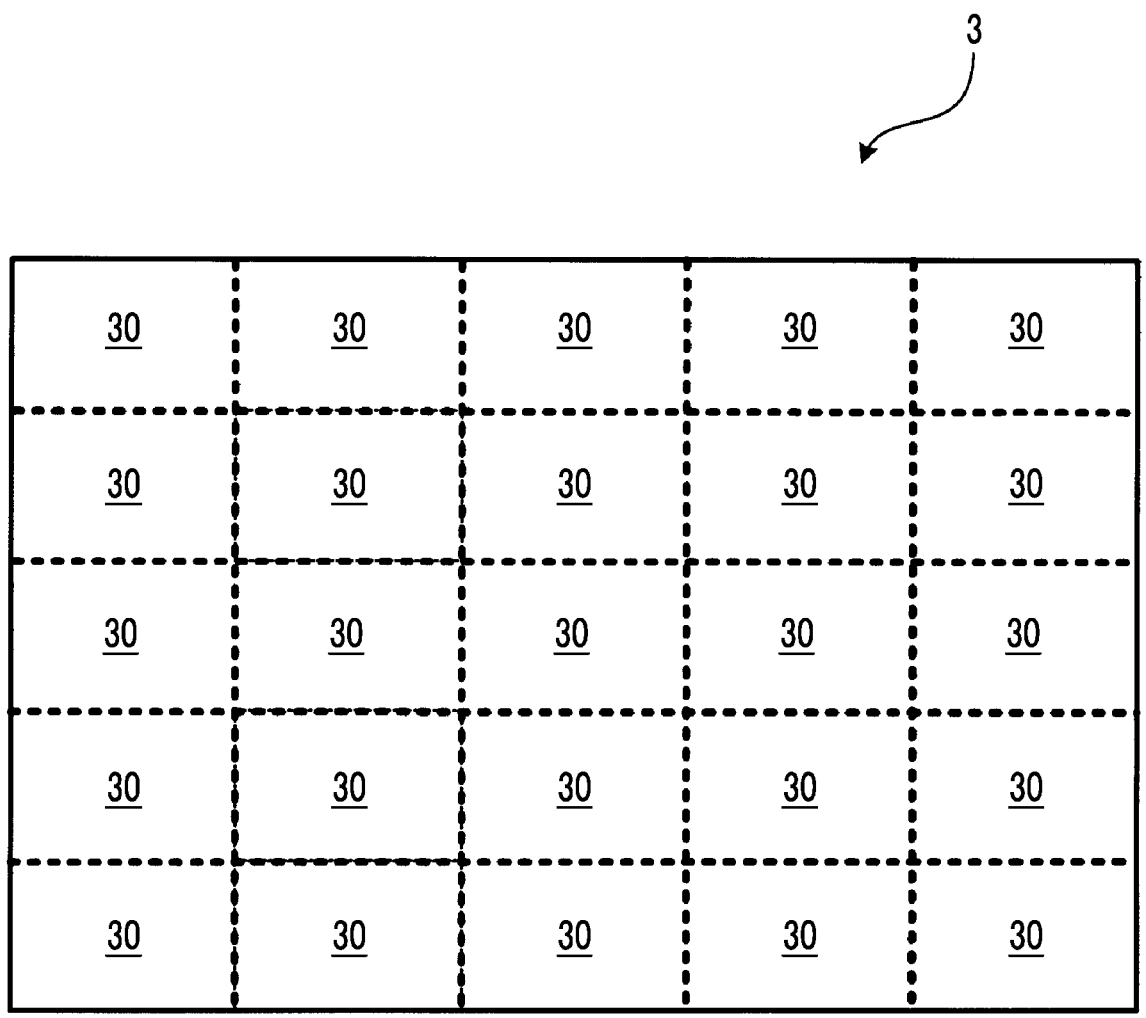
FIG. 8 is a diagram illustrating an example of division of a variable ND filter.

In description of this modification example, for example, the light transmission area of the variable ND filter 3 is divided into a plurality (in an example illustrated in FIG. 8, 25) of blocks 30 as illustrated in FIG. 8, and the transmittance control unit 11A controls a distribution of transmittance in each block 30 to the state illustrated in FIG. 5. The block 30 constitutes a first block.

Figure 9:
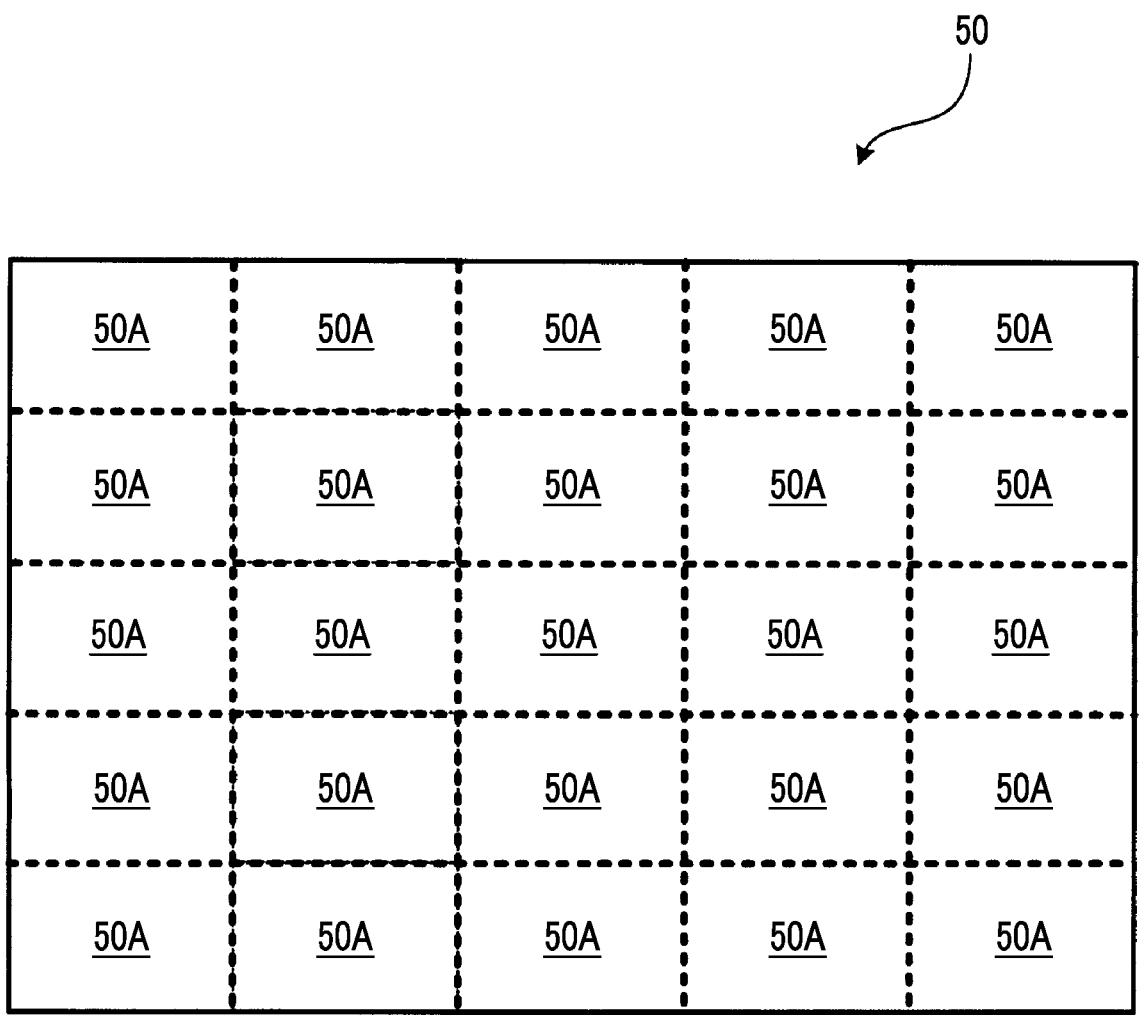
FIG. 9 is a diagram illustrating an example of division of a captured image signal.

In this modification example, a captured image signal 50 obtained by the imaging for light measurement is handled by dividing the captured image signal 50 into a plurality (in an example illustrated in FIG. 9, 25) of blocks 50A corresponding to the blocks 30 in FIG. 8 as illustrated in FIG. 9.

Each block 50A is obtained by photoelectrically converting the subject light transmitted through the corresponding block 30. Numbers 1 to 25 are assigned to the 25 blocks 50A. The block 50A constitutes a second block.

Figure 10:
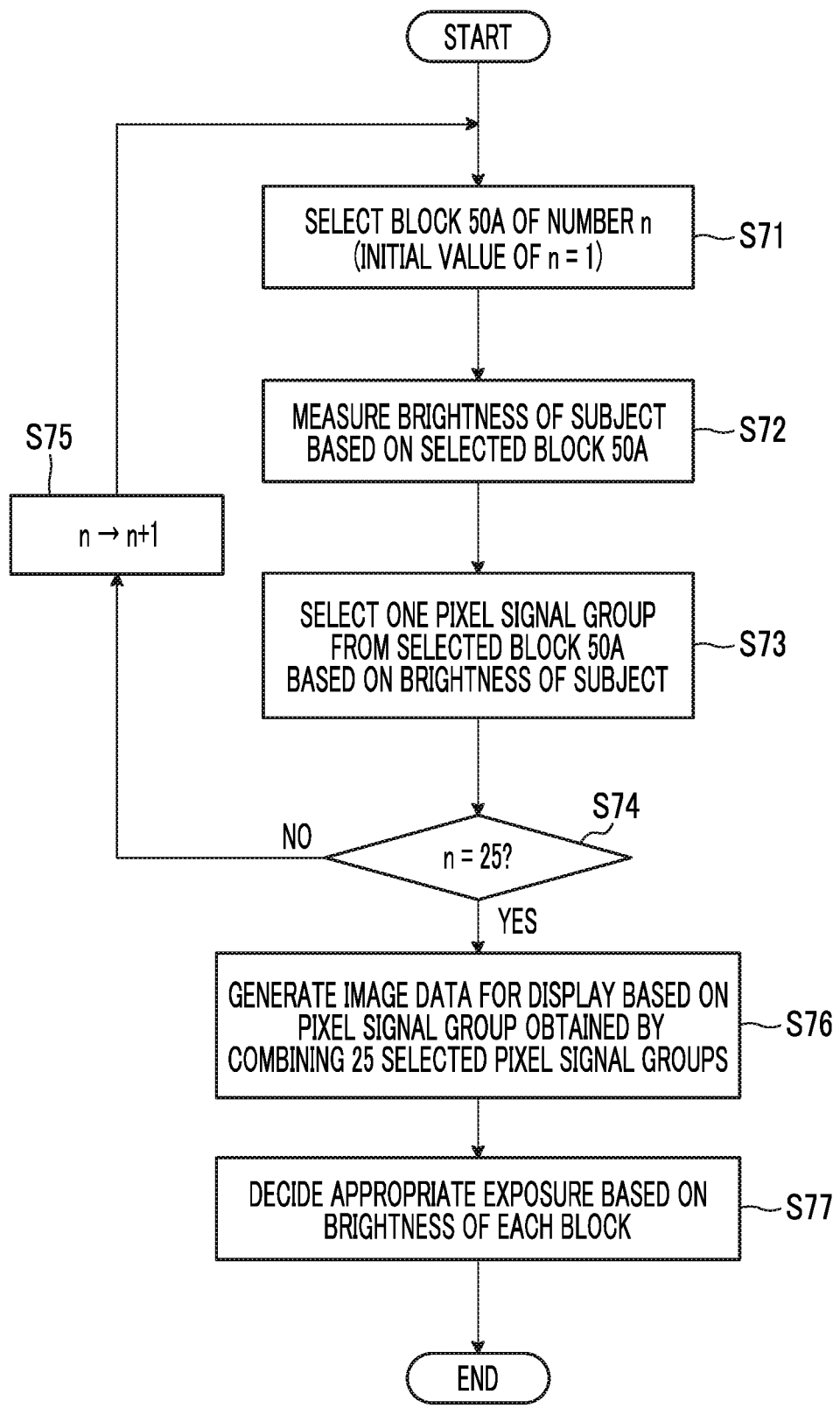
FIG. 10 is a flowchart for describing a modification example of step S6 and step S7 in FIG. 7.

FIG. 10 is a flowchart for describing a modification example of step S6 and step S7 in FIG. 7.

In a case where the captured image signal is obtained by the imaging for light measurement, the light measurement processing unit 11C selects the block 50A of a number n in the captured image signal (step S71). An initial value of n is 1.

The selected block 50A is configured with the first pixel signal group, the second pixel signal group, the third pixel signal group, and the fourth pixel signal group.

Next, the light measurement processing unit 11C measures the brightness of the subject in the block 50A based on the first pixel signal group, the second pixel signal group, the third pixel signal group, and the fourth pixel signal group of the selected block 50A (step S72).

Next, the image processing unit 17A selects one pixel signal group from the first pixel signal group, the second pixel signal group, the third pixel signal group, and the fourth pixel signal group constituting the selected block 50A based on the brightness of the subject measured for the block 50A by the light measurement processing unit 11C (step S73).

Specifically, the image processing unit 17A selects the pixel signal group having brightness most similar to the brightness of the subject measured by the light measurement processing unit 11C from the first pixel signal group, the second pixel signal group, the third pixel signal group, and the fourth pixel signal group. The image processing unit 17A temporarily stores the selected pixel signal group.

After step S73, the image processing unit 17A determines whether or not the number n is 25 (step S74). In a case where the number n is not 25 (step S74: NO), the image processing unit 17A increases the number n by 1 (step S75) and returns processing to step S71.

In a case where a YES determination is made in step S74 by repeating processing of step S71 to step S75, the image processing unit 17A generates the image data for live view display based on the pixel signal group obtained by combining 25 temporarily stored pixel signal groups (step S76).

After processing of step S76 or in parallel with the processing, the light measurement processing unit 11C decides the final brightness of the subject based on the brightness of the subject measured for all blocks 50A. Appropriate exposure is decided by the imaging control unit 11B based on the brightness (step S77). Then, processing from step S8 in FIG. 7 is performed.

As described above, according to the modification example, the live view image is an image in which brightness of parts corresponding to all blocks 50A are not uniform and brightness corresponds to the subject for each part. Thus, a live view image as in the case of performing imaging by applying a half ND filter can be displayed. Accordingly, even in the case of a subject in which washed-out whites or blocked-up shadows may partially occur, the subject can be properly checked by the live view image.

In the modification example, the distribution of transmittance in the blocks 30 in FIG. 8 may be set as illustrated in FIG. 3 or FIG. 4. In a case where the distribution is set as illustrated in FIG. 5, a shift in pixel position for each pixel signal group can be reduced at the time of combining the 25 pixel signal groups in step S76. Thus, the quality of the live view image can be improved.

Next, a configuration of a smartphone as the imaging apparatus according to the embodiment of the present invention will be described.

Figure 11:
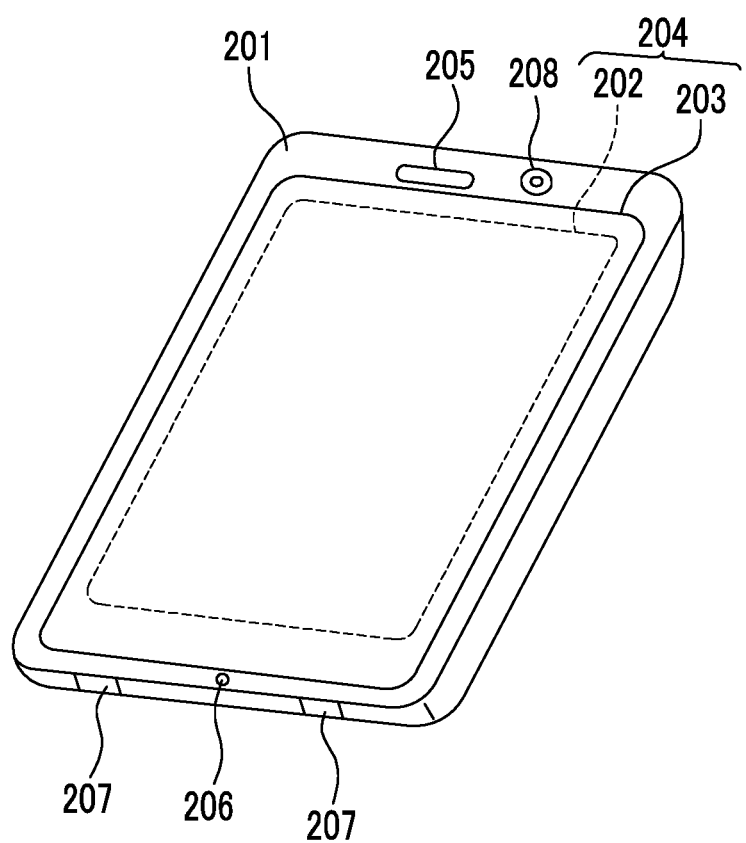
FIG. 11 illustrates an exterior of a smartphone 200 that is the imaging apparatus according to one embodiment of the present invention.

FIG. 11 illustrates an exterior of a smartphone 200 that is the imaging apparatus according to one embodiment of the present invention.

The smartphone 200 illustrated in FIG. 11 includes a casing 201 having a flat plate shape and comprises a display and input unit 204 in which a display panel 202 as a display surface and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display surface and the input unit are independently disposed, or a configuration that has a folded structure or a sliding mechanism.

Figure 12:
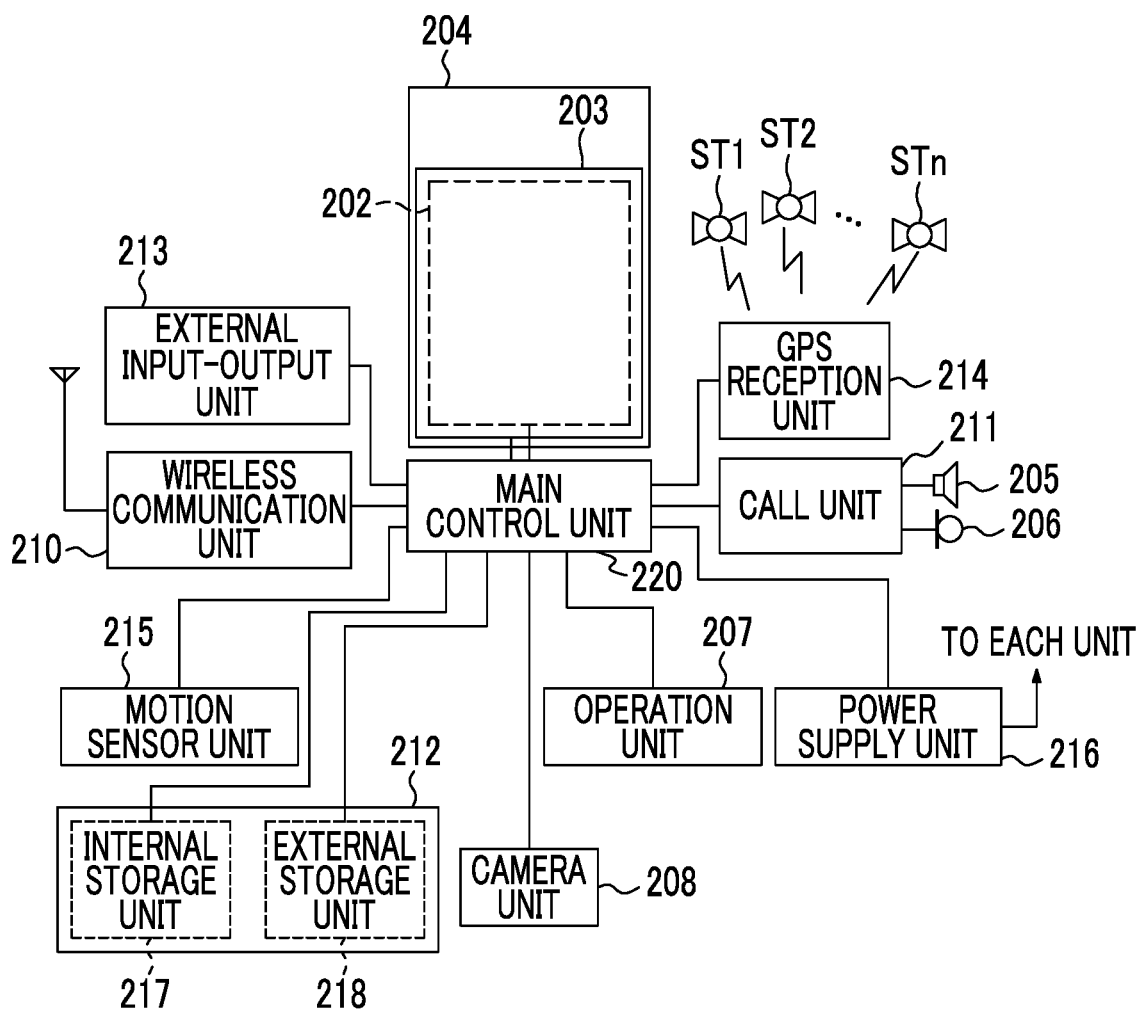
FIG. 12 is a block diagram illustrating a configuration of the smartphone 200 illustrated in FIG. 11.

FIG. 12 is a block diagram illustrating a configuration of the smartphone 200 illustrated in FIG. 11.

As illustrated in FIG. 12, a wireless communication unit 210, the display and input unit 204, a call unit 211, the operation unit 207, the camera unit 208, a storage unit 212, an external input-output unit 213, a global positioning system (GPS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 12, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 11, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 11, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

The storage unit 212 stores a control program and control data of the main control unit 220, application software, address data in which a name, a telephone number, or the like of a communication counterpart is associated, transmitted and received electronic mail data, web data downloaded by web browsing, and downloaded contents data, and temporarily stores streaming data or the like. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes a position measurement calculation process based on the received plurality of GPS signals, and detects a position that includes a latitude, a longitude, and an altitude of the smartphone 200 in accordance with an instruction from the main control unit 220. In a case where positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the relate art and means an operation of drawing a trajectory by the finger or the like, designating a plurality of positions at the same time, or drawing a trajectory for at least one of the plurality of positions as a combination thereof.

The camera unit 208 includes configurations other than the external memory control unit 20, the storage medium 21, the display unit 22, and the operation unit 14 in the digital camera 100 illustrated in FIG. 1.

A captured image generated by the camera unit 208 can be stored in the storage unit 212 or be output through the external input-output unit 213 or the wireless communication unit 210.

In the smartphone 200 illustrated in FIG. 11, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GPS reception unit 214, voice information (may be text information acquired by performing voice to text conversion by the main control unit or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, both an increase in speed of a light measurement operation for the subject and an increase in quality of the live view image can be established.

In the digital camera 100 in FIG. 1, the variable ND filter 3 and the ND drive unit 3A may be incorporated in the attachable and detachable lens device 40A, and the lens control unit 4 may control the ND drive unit 3A in accordance with an instruction from the system control unit 11.

While the system control unit 11 and the digital signal processing unit 17 are configured to include all function blocks of the imaging control device, the system control unit 11 may be configured to include all function blocks of the imaging control device.

As described thus far, the following matters are disclosed in the present specification.

(1)

An imaging control device comprising a transmittance control unit that controls transmittance of each of a plurality of regions in an optical element for controlling a quantity of light incident on an imaging element to a different value, an imaging control unit that causes the imaging element to perform imaging for light measurement in a state where the transmittance of each of the plurality of regions is controlled to the different value, a light measurement processing unit that measures brightness of a subject based on a captured image signal obtained from the imaging element by the imaging for light measurement, an image processing unit that generates image data for display from the captured image signal obtained by the imaging for light measurement, and an output unit that outputs the image data for display to a display unit displaying an image.

(2)

The imaging control device according to (1), in which the image processing unit generates the image data for display based on any one pixel signal group of pixel signal groups corresponding respectively to the plurality of regions in the captured image signal.

(3)

The imaging control device according to (2), in which the image processing unit generates the image data for display based on a pixel signal group corresponding to the region having the highest transmittance from the pixel signal groups corresponding respectively to the plurality of regions in the captured image signal.

(4)

The imaging control device according to (2), in which the image processing unit selects one pixel signal group from the pixel signal groups corresponding respectively to the plurality of regions in the captured image signal based on the brightness measured by the light measurement processing unit, and generates the image data for display based on the selected pixel signal group.

(5)

The imaging control device according to (4), in which the image processing unit selects a pixel signal group having brightness similar to the brightness measured by the light measurement processing unit from the pixel signal groups corresponding respectively to the plurality of regions in the captured image signal.

(6)

The imaging control device according to (1), in which the transmittance control unit controls the optical element to a state where the plurality of regions having different transmittance are included in each of a plurality of first blocks obtained by dividing the optical element, the light measurement processing unit measures the brightness of the subject for each of second blocks of the captured image signal corresponding to the plurality of first blocks based on the second blocks, and the image processing unit selects one pixel signal group from pixel signal groups corresponding respectively to the plurality of regions among the second blocks of the captured image signal based on the brightness measured for the second blocks by the light measurement processing unit, and generates the image data for display based on a pixel signal group obtained by combining the selected pixel signal group for all second blocks.

(7)

The imaging control device according to (6), in which the image processing unit selects a pixel signal group having brightness most similar to the brightness measured for the second blocks by the light measurement processing unit from the pixel signal groups corresponding respectively to the plurality of regions among the second blocks of the captured image signal.

(8)

The imaging control device according to any one of (1) to (7), in which the plurality of regions are configured with each of a plurality of sub-regions in a state where a set of the plurality of sub-regions of different transmittance arranged in a predetermined pattern is repeatedly arranged over an entire light transmission area of the optical element.

(9)

An imaging apparatus comprising the imaging control device according to any one of (1) to (8), and the imaging element.

(10)

The imaging apparatus according to (9), further comprising the optical element.

(11)

An imaging control method comprising a transmittance control step of controlling transmittance of each of a plurality of regions in an optical element for controlling a quantity of light incident on an imaging element to a different value, an imaging control step of causing the imaging element to perform imaging for light measurement in a state where the transmittance of each of the plurality of regions is controlled to the different value, a light measurement processing step of measuring brightness of a subject based on a captured image signal obtained from the imaging element by the imaging for light measurement, an image processing step of generating image data for display from the captured image signal obtained by the imaging for light measurement, and an output step of outputting the image data for display to a display unit displaying an image.

(12)

The imaging control method according to (11), in which in the image processing step, the image data for display is generated based on any one pixel signal group of pixel signal groups corresponding respectively to the plurality of regions in the captured image signal.

(13)

The imaging control method according to (12), in which in the image processing step, the image data for display is generated from the pixel signal groups corresponding respectively to the plurality of regions in the captured image signal based on a pixel signal group corresponding to the region having the highest transmittance.

(14)

The imaging control method according to (12), in which in the image processing step, one pixel signal group is selected from the pixel signal groups corresponding respectively to the plurality of regions in the captured image signal based on the brightness measured in the light measurement processing step, and the image data for display is generated based on the selected pixel signal group.

(15)

The imaging control method according to (14), in which in the image processing step, a pixel signal group having brightness similar to the brightness measured by the light measurement processing unit is selected from the pixel signal groups corresponding respectively to the plurality of regions in the captured image signal.

(16)

The imaging control method according to (11), in which in the transmittance control step, the optical element is controlled to a state where the plurality of regions having different transmittance are included in each of a plurality of first blocks obtained by dividing the optical element, in the light measurement processing step, the brightness of the subject is measured for each of second blocks of the captured image signal corresponding to the plurality of first blocks based on the second blocks, and in the image processing step, one pixel signal group is selected from pixel signal groups corresponding respectively to the plurality of regions among the second blocks of the captured image signal based on the brightness measured for the second blocks in the light measurement processing step, and the image data for display is generated based on an image signal group obtained by combining the selected pixel signal group for all second blocks.

(17)

The imaging control method according to (16), in which in the image processing step, a pixel signal group having brightness most similar to the brightness measured for the second blocks in the light measurement processing step is selected from the pixel signal groups corresponding respectively to the plurality of regions among the second blocks of the captured image signal.

(18)

The imaging control method according to any one of (11) to (17), in which the plurality of regions are configured with each of a plurality of sub-regions in a state where a set of the plurality of sub-regions of different transmittance arranged in a predetermined pattern is repeatedly arranged over an entire light transmission area of the optical element.

(19)

An imaging control program causing a computer to execute a transmittance control step of controlling transmittance of each of a plurality of regions in an optical element for controlling a quantity of light incident on an imaging element to a different value, an imaging control step of causing the imaging element to perform imaging for light measurement in a state where the transmittance of each of the plurality of regions is controlled to the different value, a light measurement processing step of measuring brightness of a subject based on a captured image signal obtained from the imaging element by the imaging for light measurement, an image processing step of generating image data for display from the captured image signal obtained by the imaging for light measurement, and an output step of outputting the image data for display to a display unit displaying an image.

While various embodiments are described above with reference to the drawings, the present invention is not limited to such examples. It is apparent that those skilled in the art may perceive various modification examples or correction examples within the scope disclosed in the claims, and those examples are also understood as falling in the technical scope of the present invention. Various constituents in the embodiment may be combined in any manner without departing from the gist of the invention.

The present application is based on Japanese Patent Application (JP2018-043103) filed on Mar. 9, 2018, the content of which is incorporated in the present application by reference.

According to the present invention, an imaging control device, an imaging apparatus, an imaging control method, and an imaging control program capable of establishing both an increase in speed of a light measurement operation for a subject and an increase in quality of a live view image can be provided.

EXPLANATION OF REFERENCES

100: digital camera
40A: lens device
1: imaging lens
2: stop
4: lens control unit
8: lens drive unit
9: stop drive unit
40B: main body unit
3: variable ND filter
3$a$: first region
3$b$: second region
3$c$: third region
3$d$: fourth region
3A: ND drive unit
30, 50A: block
5: imaging element
5A: imaging element drive unit
11: system control unit
11A: transmittance control unit
11B: imaging control unit
11C: light measurement processing unit
14: operation unit
15: memory control unit
16: memory
17: digital signal processing unit
17A: image processing unit
17B: output unit
20: external memory control unit
21: storage medium
22: display unit
24: control bus
25: data bus
FL: flicker waveform
NL: transmittance waveform
IL: subject light quantity waveform
T1, T2, T3: cycle
200: smartphone
201: casing
202: display panel
203: operation panel
204: display and input unit
205: speaker
206: microphone
207: operation unit
208: camera unit 210: wireless communication unit
211: call unit
212: storage unit
213: external input-output unit
214: GPS reception unit
215: motion sensor unit
216: power supply unit
217: internal storage unit
218: external storage unit
220: main control unit
ST1 to STn: GPS satellite

What is claimed is:

1. An imaging control device comprising:
at least one processor, configured to:
control transmittance of each of a plurality of regions in an optical element for controlling a quantity of light incident on an imaging element to a different value;
cause the imaging element to perform imaging for light measurement in a state where the transmittance of each of the plurality of regions is controlled to the different value;
measure brightness of a subject based on a captured image signal obtained from the imaging element by the imaging for light measurement;
select at least one pixel signal group from pixel signal groups that constitute the captured image signal and correspond respectively to the plurality of regions, and generate image data for display based on the selected at least one pixel signal group; and
output the image data for display to a display unit displaying an image.

2. The imaging control device according to claim 1, wherein the at least one processor selects one pixel signal group from the pixel signal groups that constitute the captured image signal, and generates the image data for display based on the selected one pixel signal group.

3. The imaging control device according to claim 2, wherein the at least one processor generates the image data for display based on a pixel signal group corresponding to the region having highest transmittance from the pixel signal groups that constitute the captured image signal and correspond respectively to the plurality of regions.

4. The imaging control device according to claim 2, wherein the at least one processor selects one pixel signal group, from the pixel signal groups that constitute the captured image signal, based on the measured brightness, and generates the image data for display based on the selected one pixel signal group.

5. The imaging control device according to claim 4, wherein the at least one processor selects a pixel signal group having brightness similar to the measured brightness, from the pixel signal groups that constitute the captured image signal.

6. The imaging control device according to claim 1, wherein the at least one processor controls the optical element to a state where the plurality of regions having different transmittance are included in each of a plurality of first blocks obtained by dividing the optical element,
the at least one processor measures the brightness of the subject for each of second blocks of the captured image signal corresponding to the plurality of first blocks based on the second blocks, and
the at least one processor selects one pixel signal group, from the pixel signal groups corresponding respectively to the plurality of regions among the second blocks of the captured image signal, based on the brightness measured for the second blocks, and generates the image data for display based on an image signal group obtained by combining the selected pixel signal groups for all of the second blocks.

7. The imaging control device according to claim 6, wherein the at least one processor selects a pixel signal group having brightness most similar to the brightness measured for the second blocks from the pixel signal groups corresponding respectively to the plurality of regions among the second blocks of the captured image signal.

8. The imaging control device according to claim 1, wherein the plurality of regions are configured with each of a plurality of sub-regions in a state where a set of the plurality of sub-regions of different transmittance arranged in a predetermined pattern is repeatedly arranged over an entire light transmission area of the optical element.

9. An imaging apparatus comprising:
the imaging control device according to claim 1; and
the imaging element.

10. The imaging apparatus according to claim 9, further comprising:
the optical element.

11. An imaging control method comprising:
a transmittance control step of controlling transmittance of each of a plurality of regions in an optical element for controlling a quantity of light incident on an imaging element to a different value;
an imaging control step of causing the imaging element to perform imaging for light measurement in a state where the transmittance of each of the plurality of regions is controlled to the different value;
a light measurement processing step of measuring brightness of a subject based on a captured image signal obtained from the imaging element by the imaging for light measurement;
an image processing step of selecting at least one pixel signal group from pixel signal groups that constitute the captured image signal and correspond respectively to the plurality of regions, and generating image data for display based on the selected at least one pixel signal group; and
an output step of outputting the image data for display to a display unit displaying an image.

12. The imaging control method according to claim 11, wherein, in the image processing step, one pixel signal group is selected from the pixel signal groups that constitute the captured image signal, and the image data for display is generated based on the selected one pixel signal group.

13. The imaging control method according to claim 12, wherein, in the image processing step, the image data for display is generated based on a pixel signal group corresponding to the region having highest transmittance from the pixel signal groups that constitute the captured image signal correspond respectively to the plurality of regions.

14. The imaging control method according to claim 12, wherein, in the image processing step, one pixel signal group is selected, from the pixel signal groups that constitute the captured image signal, based on the brightness measured in the light measurement processing step, and the image data for display is generated based on the selected one pixel signal group.

15. The imaging control method according to claim 14,
wherein, in the image processing step, a pixel signal group having brightness similar to the brightness measured in the light measurement processing step is selected from the pixel signal groups that constitute the captured image signal.

16. The imaging control method according to claim 11,
wherein, in the transmittance control step, the optical element is controlled to a state where the plurality of regions having different transmittance are included in each of a plurality of first blocks obtained by dividing the optical element,
in the light measurement processing step, the brightness of the subject is measured for each of second blocks of the captured image signal corresponding to the plurality of first blocks based on the second blocks, and
in the image processing step, one pixel signal group is selected from the pixel signal groups corresponding respectively to the plurality of regions among the second blocks of the captured image signal based on the brightness measured for the second blocks in the light measurement processing step, and the image data for display is generated based on an image signal group obtained by combining the selected pixel signal groups for all of the second blocks.

17. The imaging control method according to claim 16,
wherein in the image processing step, a pixel signal group having brightness most similar to the brightness measured for the second blocks in the light measurement processing step is selected from the pixel signal groups corresponding respectively to the plurality of regions among the second blocks of the captured image signal.

18. The imaging control method according to claim 11,
wherein the plurality of regions are configured with each of a plurality of sub-regions in a state where a set of the plurality of sub-regions of different transmittance arranged in a predetermined pattern is repeatedly arranged over an entire light transmission area of the optical element.

19. A non-transitory computer readable medium storing an imaging control program causing a computer to execute:
a transmittance control step of controlling transmittance of each of a plurality of regions in an optical element for controlling a quantity of light incident on an imaging element to a different value;
an imaging control step of causing the imaging element to perform imaging for light measurement in a state where the transmittance of each of the plurality of regions is controlled to the different value;
a light measurement processing step of measuring brightness of a subject based on a captured image signal obtained from the imaging element by the imaging for light measurement;
an image processing step of selecting at least one pixel signal group from pixel signal groups that constitute the captured image signal and correspond respectively to the plurality of regions, and generating image data for display based on the selected at least one pixel signal group; and
an output step of outputting the image data for display to a display unit displaying an image.

* * * * *